United States Patent Office 3,755,470
Patented Aug. 28, 1973

3,755,470
PROCESS FOR PREPARING POLYHALO PHENOLS
Edwin B. Michaels, Gregory Court 06855, and John W. Lee, Glen Ave. 06850, both of Norwalk, Conn.
No Drawing. Filed July 31, 1968, Ser. No. 748,982
Int. Cl. C07c 39/32
U.S. Cl. 260—623 R                     10 Claims

ABSTRACT OF THE DISCLOSURE

A process is provided for the hydrolysis of polyhalobenzene to polyhalo phenols in good yields and purity by initially reacting ethylene glycol with an alkali metal hydroxide to obtain a mixture comprising ethylene glycol alkali metal derivative, alkali metal hydroxide and ethylene glycol, adding to the latter mixture an alkane of from 6 to 14 carbon atoms or mixtures of the same, such as mineral spirits or deodorized kerosene, then introducing a polyhalobenzene, whereby hydrolysis of the latter occurs and, thereafter, recovering the so-hydrolyzed benzene.

---

The present invention relates to the manufacture of polyhalophenols as well as to the corresponding alkali metal phenates of the same. More particularly, it relates to the manufacture of a trichlorophenol by the hydrolysis of a tetrachlorobenzene utilizing a hydrolysis mixture comprising ethylene glycol alkali metal derivative, an alkane of from 6 to 14 carbon atoms or mixtures thereof and with attendant recovery of trichlorophenols in good yields and purity. Still more particularly, the invention is concerned with the manufacture of a trichlorophenol of at least ninety-nine (99) percent purity with attendant high yields of ethylene glycol recovery by utilizing a plurality of operations commencing with a hydrolysis mixture comprising (a) an ethylene glycol alkali metal derivative, ethylene glycol and alkali metal hydroxide, and (b) an alkane of from 6 to 14 carbon atoms or mixtures thereof, then adding a tetrachlorobenzene thereto, effecting hydrolysis, adjusting the alkalinity of the resultant hydrolyzed mixture to a pH between 11 and 13, incorporating a high boiling higher alkane such as those containing from 16 to 24 carbon atoms, whereby ethylene glycol is recovered by distillation and, thereafter, advantageously recovering trichlorophenols from the corresponding alkali metal phenate solution.

As is known, chlorinated benzenes and, particularly 1,2,4,5-tetrachlorobenzene, can be hydrolyzed by diverse methods, each of which is not wholly satisfactory with respect to over-all yield and purity. For instance, the hydrolysis of chlorinated benzenes proceeds with great difficulty using caustic soda except under extremely high temperatures and pressures. To overcome such rigorous conditions, sundry alcohols, as for example methanol or ethylene glycol, have been employed in an hydrolysis mixture so as to control the rate of halobenzene hydrolysis, whereby only a single hydroxyl group appears on the benzene moiety. However, the use of the methanol is not satisfactory, since the formation of ether type derivatives, such as anisoles, occurs and the latter cannot be removed readily from the so-formed halophenol, thereby reducing markedly the purity of the resultant phenol. The use of glycols has also been found to be unsatisfactory, due to the presence of large excesses of water formed during the formation of ethylene glycol alkali metal derivative with a base. In practice, the hydrolysis reaction is difficult to perform and, therefore, has been markedly restricted, due to the inhibiting action of water, unless all the water is removed prior to hydrolysis by means of an inert entraining agent. However, the entrainment of water results in the formation of large amounts of difficult-to-remove by-products. In addition, the use of glycol involves the steps of either distilling the same directly from the reaction mixture which will result in degradation of the hydrolyzed polyhalobenzene or effecting acidification followed by water washing to recover the glycol from the water by a series of troublesome, costly fractionations. If a method could be provided to overcome the foregoing difficulties, it would serve to fulfill a long-felt need in the art.

It is, therefore, a principal object of the invention to provide economical hydrolysis process for converting polyhalobenzenes to alkali metal polyhalophenates and to the corresponding polyhalophenols utilizing a menstruum containing (a) free alkali metal hydroxide, free ethylene glycol and ethylene glycol alkali metal derivative and (b) an alkane of from 6 to 14 carbon atoms or mixtures thereof, whereby high yields usually ranging from 88% to 92% and high purity, usually not less than 99%, of polyhalophenols are obtained. It is a further object of the invention to provide an economical method for the recovery of ethylene glycol from a hereinabove defined hydrolyzed mixture or equivalent mixtures utilizing a higher boiling alkane of from 16 to 24 carbon atoms. It is a still further object of the invention to recover by distillation a pure halogenated phenol from a crude halogenated phenol material by admixing ammonia or ammonium hydroxide therewith. Other objects and advantages will become apparent from a reading of the ensuing description.

According to the process of the invention, high yields of polyhalophenols and, particularly trichlorophenols, of more than 85% of theory in purities of 99%, or higher, have been surprisingly prepared in essentially a three step operation. These critical steps involve the initial reaction of ethylene glycol with an alkali metal hydroxide with resultant formation of a mixture of alkali metal hydroxide, ethylene glycol and ethylene glycol alkali metal derivative and in a second step incorporating into said mixture a small amount of hydrolysis controlling reagent comprising an alkane of from 6 to 14 carbon atoms. To the latter is then added in a third step a polyhalogenated benzene and, particularly tetrachlorobenzene. Unexpectedly, high yields of desired alkali metal polyhalogenated phenates and the corresponding polyhalogenated phenols are obtained in good yield and purity.

In general, the hydrolysis mixture can advantageously be prepared by reacting from four (4) to eight (8) mols of ethylene glycol, and preferably from five (5) to six and one-half (6.5) mols of ethylene glycol, and from about two and two-tenths (2.2) mols to about three (3) mols of an alkali metal hydroxide, such as sodium hydroxide, potassium hydroxide or lithium hydroxide until from one to two mols of water are removed from the mixture. If more than two mols of water are removed, the amount in excess of two mols is then re-introduced into resultant mixture. There is then provided a mixture of from 1 to 2 mols of ethylene glycol alkali metal derivative, from 0.2 to 2 mols of free alkali metal hydroxide and from 2 to 7 mols of free ethylene glycol. The reaction in which there is formed the desired mixture, is advantageously carried out under pressures ranging from 100 mm. Hg to atmospheric at temperatures between about 150° C. and about 210° C. However, with the continuous evolution of water beyond the two mols of water by entrainment or the use of other means to form the glycol alkali metal derivative, there is obtained a hydrolysis mixture in which no free alkali metal hydroxide or free glycol is found. Where the latter mixture is employed, there is noted marked losses in yield and purity of hydrolyzed polyhalobenzene due to the formation of undesirable condensation reactions.

To the above pre-reacted ethylene glycol hydrolysis mixture is then added a hydrolysis controlling agent, namely, an alkane of from 6 to 14 carbon atoms or mixtures thereof. The amount incorporated ranges advantageously from about 0.01 mol to about 0.10 mol per mol of the tetrahalobenzene to be hydrolyzed. Exemplary of the alkanes or mixtures thereof which can be employed as the hydrolysis controlling reagent are: hexane, heptane, octane, nonane, decane, undecane, dodecane, tridecane, tetradecane, mineral spirits, deodorized kerosene, mixed alkanes containing from 6 to 8 carbon atoms and having a boiling point range of from 70° C. to 130° C. Absent the added hydrolysis controlling reagent the resultant hydrolysis is uncontrollable, resulting in a tarry mass.

Illustrative of the polyhalobenzenes to be treated by the so-formed hydrolysis mixture are 1,2,4,5-tetrachlorobenzene, 1,2,3,5-tetrachlorobenzene, or 1,2,4-trichlorobenzene, or 1,2,4-tribromobenzene, or pentachlorobenzene. Advantageously, the time to effect the hydrolysis ranges from one to three hours at reflux temperatures usually in the range of from about 170° C. to 200° C. The pH of the resultant hydrolyzed mixture is 14.

The aforementioned hydrolyzed mixture can, if desired, be next acidified with any inert acid, such as hydrochloric acid or sulfuric acid, to reduce the pH from 14 to about 11 to 13 and, preferably from 12 to 12.5. There is next added thereto an alkane of from 16 to 24 carbon atoms such as hexadecane, heptadecane, eicosane, mineral oils or paraffin in amounts ranging from 10 to 60 grams per mol of polyhalobenzene and, particularly, the tetrahalobenzene employed. This addition is critical, because otherwise purity of product of hydrolyzed polyhalobenzene is not realized due to formation of side reactions and substantial loss of resultant corresponding alkali metal phenate and glycol is experienced. Water and the hydrolysis controlling reagent are initially removed and recovery of ethylene glycol is next achieved without any reduction in over-all yield of desired final product which, for instance, can be trichlorophenol. To recover the latter trichlorophenol, there is utilized vacuum distillation at pressures ranging from about 8 mm. Hg to 10 mm. Hg pressure. The glycol distillate is then recovered.

Resultant residue is admixed with sufficient water to dissolve the alkali metal phenate formed during hydrolysis. The water layer is next separated from any residual, water-insoluable organic substance. To the water layer is added sufficient acid, such as sulfuric acid, to further reduce the pH of the mixture to form 4 to 4.5, whereby the recovered alkali metal phenate is converted to the corresponding halogenated phenol. Two layers form again. The upper water layer is discarded, but the lower layer containing the phenol is washed several times with water at temperatures ranging from about 65° C. to 100° C. To insure purity of latter product, there is admixed miniscule amounts of ammonia or ammonium hydroxide, usually in the range of from about 1 cc. to 5 cc., to the recovered phenol. The latter mixture is dehydrated and flash distilled at from 1 mm. Hg to 5 mm. Hg pressure to recover at least 99% pure halogenated phenol in yields ranging from about 89% to about 92% of theory. Advantageously, the utilization of ammonia or ammonium hydroxide is applicable to the purification and recovery of any halogenated phenol prior to vacuum distilling the latter relatively crude halogenated phenol.

The following examples are presented as merely illustrative and are not to be taken as being limitative of the invention. Unless otherwise stated, any parts given are by weight.

EXAMPLE 1

To a stainless steel reaction vessel equipped for vacuum distillation are added 3.0 mols of potassium hydroxide and 8.0 mols of ethylene glycol and heated to a temperature of 160° C. under a vacuum of 150 mm. Hg to remove 1.8 mols of water. Thereafter, 5 grams of mineral spirits, sold as Varsol No. 3 Humble Oil, are added to the mixture comprising ethylene glycol potassium derivative, free ethylene glycol and free potassium hydroxide. To the latter are added 1.0 mol of 1,2,4,5-tetrachlorobenzene. The temperature which has dropped to 140° C. is gradually raised to 180° C. and maintained for two hours under gentle reflux in which no water or solvent are lost to the atmosphere. The hydrolysis reaction is completed when there is an absence of tetrachlorobenzene in the reaction mixture. There is then recovered a mixture containing potassium 2,4,5-trichlorophenate.

Substituting n-hexane for mineral spirits and sodium hydroxide for potassium hydroxide, a mixture of sodium 2,4,5-trichlorophenate is similarly obtained.

EXAMPLE 2

The resultant mixture of Example 1 containing potassium 2,4,5-trichlorophenate is treated to recover glycol therefrom by neutralizing excess alkali. This is accomplished by adding 24 grams of 66% sulfuric acid so as to reduce the pH from 14 to a pH of 12.5. 20 grams of paraffin having a melting point of 135° F. are next added to the so-acidified mixture and placed under 150 mm. Hg to flash over mineral spirits and traces of water. Ethylene glycol (6.6 mols) is next distilled off and recovered.

Residual potassium 2,4,5-trichlorophenate and paraffin are then diluted with 250 cc. water. The latter phenate dissolves in the water and the paraffin is separated from the phenate solution.

To the latter phenate solution is next added 96 grams of 66% sulfuric acid to convert the phenate to the corresponding 2,4,5-trichlorophenol at a pH of about 4.0 which separates at between 60° C. and 80° C. as an oily layer and is washed with hot water to remove free acid. The crude phenol at this point is recovered in a yield of 190 grams having a crystallizing point of 54° C.

To the crude phenol is added 3 milliliters of concentrated ammonium hydroxide. The latter effectively neutralizes any entrained acids and forms miniscule amounts of the corresponding ammonium phenate which decomposes under conditions of distillation. The presence of small amounts of ammonium phenates prevents decomposition of the phenol due to avoidance of either excess alkali or acid during the distillation procedure.

Resultant 2,4,5 - trichlorophenol is dehydrated and flashed distilled under vacuum and there is collected 176 grams of 2,4,5-trichlorophenol equivalent to a 90% yield and having a crystallizing point of 63.5° C.

EXAMPLE 3

The procedure of Example 2 above is repeated in every respect except that the mineral spirits additive is omitted as an hydrolysis controlling reagent. There results a tarry mass with an attendant uncontrollable hydrolysis reaction with temperatures rising to as high as 250° C.

EXAMPLE 4

Repeating Example 2 in every detail except for the ethylene glycol pre-reaction, there is substituted 1.5 mols of molten sodium metal under nitrogen and 8 mols of ethylene glycol in which one mol of sodium hydroxide has been previously dissolved to yield free sodium hydroxide, free ethylene glycol and ethylene glycol monosodium derivative.

An over-all yield of 91% and 99.1% purity of 2,4,5-trichlorophenol are attained.

EXAMPLE 5

Repeating the procedure of Example 2 in every detail except that in the pre-reaction step prior to hydrolysis, 2 mols of water are withdrawn and collected and 6 grams of tridecane are employed as the hydrolysis controlling reagent for an over-all reaction time of one hour at 175° C., there is ultimately recovered 179 grams of 2,4,5-trichlorophenol having a crystallizing point of 64.0° C.

EXAMPLE 6

The procedure of Example 2 is repeated in every detail except that 4 grams of dodecane are substituted for the mineral spirits with attendant over-all 90% yields of 2,4,5-trichlorophenol, having a crystallizing point of 64° C. and a purity of 99.2%.

EXAMPLE 7

Repeating Example 2 in every detail except pentachlorobenzene is substituted for 1,2,4,5-tetrachlorobenzene, there is obtained good over-all yields of 2,3,5,6,tetrachlorophenol.

Similarly, either 1,2,4-trichlorobenzene or 1,2,4-tribromobenzene is hydrolyzed as in the above example to obtain high yields and purity of 2,5-dichlorophenol or 2,5-dibromophenol, respectively.

EXAMPLE 8

To a stainless steel reaction vessel equipped with vacuum distillation are added 2.5 mols of sodium hydroxide and 6.0 mols of ethylene glycol and heated to a temperature of 160° C. under a vacuum of 150 mm. Hg to remove 1.5 mols of water. Thereafter, 5 grams of deodorized kerosene having a boiling point range of from 450° F. to 520° F. are added to the mixture comprising ethylene glycol sodium derivative, free ethylene glycol and free sodium hydroxide. To the latter are added 1.0 mol of -,2,4,5-tetrachlorobenzene. The temperature which has dropped to 140° C. is gradually raised to 180° C. and maintained for two hours under gentle reflux in which no water or solvent are lost to the atmosphere. The hydrolysis reaction is complete by the absence of tetrachlorobenzene. There is then recovered a mixture containing sodium 2,4,5-trichlorophenate.

EXAMPLE 9

The resultant mixture of Example 8 containing sodium 2,4,5-trichlorophenate is treated to recover glycol therefrom by neutralizing excess alkali. This is accomplished by adding 24 grams of 66% sulfuric acid so as to reduce the pH from 14 to a pH of 12.5. 30 grams of mineral oil having a Saybolt viscosity of 65/75 are next added to the so-acidified mixture and placed under 150 mm. Hg to flash over mineral spirits and traces of water. Ethylene glycol (4.2 mols) is next distilled off and recovered.

Residual sodium 2,4,5-trichlorophenate and paraffin are then diluted with 250 cc. water. The latter phenate dissolves in the water and the mineral oil is separated from the phenate solution.

To the latter phenate solution is next added 96 grams of 66% sulfuric acid to convert the phenate to the free corresponding 2,4,5-trichlorophenol at a pH of about 4.0 which separated at between 60° C. and 80° C. as an oily layer and washed with hot water to remove free acid. The crude phenol at this point is recovered in a yield of 190 grams having a crystallizing point of 54° C.

To the crude phenol is added 3 milliliters of concentrated ammonium hydroxide. This neutralizes any entrained acid and forms miniscule amounts of the corresponding ammonium phenate which decomposes under conditions of distillation. The latter prevents decomposition of the phenol due to avoidance of either excess alkali or acid during the distillation procedure.

Resultant 2,4,5 - trichlorophenol is dehydrated and flashed distilled under vacuum and there is collected 176 grams of 2,4,5-trichlorophenol equivalent to a 90% yield and having a crystallizing point of 63.5° C.

EXAMPLE 10

The procedure of Example 9 is followed in every material aspect except that the hydrolysis controlling reagent is a mixture of alkanes of from 6 to 8 carbon atoms having a boiling point range of from 70° C. to 130° C. in lieu of the deodorized kerosene additive. Similar glycol and 2,4,5-trichlorophenol recoveries and purities are obtained.

We claim:

1. In a process for preparing polychlorophenols or polybromophenols from polychlorobenzenes or polybromobenzenes by subjecting the latter to hydrolysis utilizing alkaline ethylene glycol, the improvement which comprises the steps of:
   (a) admixing in the absence of an inert water-entraining agent of from 4 to 8 mols of ethylene glycol with from 2.2 mols to 3 mols of an alkali metal hydroxide,
   (b) heating the mixture to a temperature from 150° C. to about 210° C. under reduced or atmospheric pressure and removing from the resultant mixture 1 to 2 mols of water, thereby forming from 1 to 2 mols of ethylene glycol alkali metal derivative, from 0.2 to 2 mols of free alkali metal hydroxide, and from 2 to 7 mols of free ethylene glycol,
   (c) incorporating into the resultant mixture of (b) above from about 0.01 mol to about 0.10 mol of an alkane hydrolysis controlling reagent of from 6 to 14 carbon atoms or mixtures thereof per mol of polychlorobenzene or polybromobenzene to be hydrolyzed to form an hydrolysis mixture,
   (d) hydrolyzing said polychlorobenzene or polybromobenzene in said hydrolysis mixture, and
   (e) acidifying resultant hydrolyzed mixture to a pH between 11 and 13.

2. A process according to claim 1 in which the polychlorobenzene is 1,2,4,5-tetrachlorobenzene.

3. A process according to claim 1 in which the alkane is mineral spirits.

4. A process according to claim 1 in which the alkane is deodorized kerosene.

5. A process according to claim 1 for preparing 2,4,5-trichlorophenol from 1,2,4,5-tetrachlorobenzene by subjecting the latter to hydrolysis utilizing alkaline ethylene glycol, which comprises the steps of:
   (a) admixing in the absence of an inert water-entraining agent of from 4 to 8 mols of ethylene glycol with from 2.2 mols to 3 mols of an alkali metal hydroxide,
   (b) heating the mixture to a temperature from 150° C. to about 210° C., under reduced or atmospheric pressure and removing from the resultant mixture 1 to 2 mols of water, thereby forming from 1 to 2 mols of ethylene glycol alkali metal derivative, from 0.2 to 2 mols of free alkali metal hydroxide and from 2 to 7 mols of free ethylene glycol,
   (c) incorporating into the resultant mixture of (b) above from 0.01 mol to 0.10 mol of an alkane hydrolysis controlling reagent of from 6 to 14 carbon atoms or mixtures thereof per mol of tetrachlorobenzene to be hydrolyzed to form a hydrolysis mixture,
   (d) incorporating one mol of 1,2,4,5-tetrachlorobenzene into said hydrolysis mixture,
   (e) hydrolyzing resultant mixture at reflux temperatures ranging from about 170° C. to about 200° C., and
   (f) recovering said hydrolyzed tetrachlorobenzene.

6. A process according to claim 5 for preparing 2,4,5-trichlorophenol from 1,2,4,5-tetrachlorobenzene by subjecting the latter to hydrolysis utilizing alkaline ethylene glycol, the improvement which comprises:
   (a) admixing in the absence of a water-entraining agent of from 4 to 8 mols of ethylene glycol with from 2.2 mols to 3 mols of an alkali metal hydroxide,
   (b) heating the mixture to a temperature from 150° C. to about 210° C., under reduced or atmospheric pressure and removing from the resultant mixture 1 to 2 mols of water, thereby forming from 1 to 2 mols of ethylene glycol alkali metal derivative, from 0.2 to 2 mols of free alkali metal hydroxide and from 2 to 7 mols of free ethylene glycol, (c) incorporating into the resultant mixture of (b) above from 0.01 mol to 0.10 mol of an alkane hydrolysis controlling reagent of from 6 to 14 carbon atoms or mixtures thereof per mol of tetrachlorobenzene to be hydrolyzed to form a hydrolysis mixture, (d) incorporating one mol of 1,2,4,5-tetrachlorobenzene into said hydrolysis mixture, (e) hydrolyzing resultant mixture at reflux temperatures ranging from about 170° C. to about 200° C., (f) acidifying the resultant hydrolyzed mixture to a pH of between 11 and 13, (g) incorporating in the so-acidified mixture of (f) an alkane of from 16 to 24 carbon atoms in amounts ranging from about 10 to 60 grams per mol of said tetrachlorobenzene, and (h) distilling the latter mixture to remove therefrom ethylene glycol.

7. A process according to claim 5 for preparing 2,4,5-trichlorophenol from 1,2,4,5-tetrachlorobenzene by subjecting the latter to hydrolysis utilizing alkaline ethylene glycol, which comprises the steps of:

(a) admixing in the absence of a water-entraining agent of from 4 to 8 mols of ethylene glycol with from 2.2 mols to 3 mols of an alkali metal hydroxide, (b) heating the mixture to a temperature from 150° C. to about 210° C., under reduced or atmospheric pressure and removing from the resultant mixture 1 to 2 mols of water, thereby forming from 1 to 2 mols of ethylene glycol alkali metal derivative, from 0.2 to 2 mols of free alkali metal hydroxide and from 2 to 7 mols of free ethylene glycol, (c) incorporating into the resultant mixture of (b) above from 0.01 mol to 0.10 mol of an alkane hydrolysis controlling reagent of from 6 to 14 carbon atoms or mixtures thereof per mol of tetrachlorobenzene to be hydrolyzed to form a hydrolysis mixture, (d) incorporating one mol of 1,2,4,5-tetrachlorobenzene into said hydrolysis mixture, (e) hydrolyzing resultant mixture at reflux temperatures ranging from about 170° C. to about 200° C., (f) acidifying the resultant hydrolyzed mixture to a pH of between 11 and 13, (g) incorporating in the so-acidified mixture of (f) an alkane of from 16 to 24 carbon atoms in amounts ranging from about 10 to 60 grams per mol of said tetrachlorobenzene, (h) distilling the latter mixture to remove therefrom ethylene glycol, and (i) acidifying the residue whereby the phenate present is converted to the corresponding phenol.

8. A process according to claim 5 for preparing 2,4,5-trichlorophenol from 1,2,4,5-tetrachlorobenzene by subjecting the latetr to hydrolysis utilizing alkaline ethylene glycol, which comprises the steps of:

(a) admixing in the absence of a water-entraining agent of from 4 to 8 mols of ethylene glycol with from 2.2 mols to 3 mols of an alkali metal hydroxide, (b) heating the mixture to a temperature from 150° C. to about 210° C., under reduced or atmospheric pressure and removing from the resultant mixture 1 to 2 mols of water, thereby forming from 1 to 2 mols of ethylene glycol alkali metal derivative, from 0.2 to 2 mols of free alkali metal hydroxide and from 2 to 7 mols of free ethylene glycol, (c) incorporating into the resultant mixture of (b) above from 0.01 mol to 0.10 mol of an alkane hydrolysis controlling reagent of from 6 to 14 carbon atoms or mixtures thereof per mol of tetrachlorobenzene to be hydrolyzed to form a hydrolysis mixture, (d) incorporating one mol of 1,2,4,5-tetrachlorobenzene into said hydrolysis mixture, (e) hydrolyzing resultant mixture at reflux temperatures ranging from about 170° C. to about 200° C., (f) acidifying the resultant hydrolyzed mixture to a pH of between 11 and 13, (g) incorporating in the so-acidified mixture of (f) an alkane of from 16 to 24 carbon atoms in amounts ranging from about 10 to 60 grams per mol of said tetrachlorobenzene, (h) distilling the latter mixture to remove therefrom ethylene glycol, (i) acidifying the phenate residue whereby the phenate present is converted to the corresponding phenol, and (j) adding to the recovered phenol of from about 1 to about 5 cc. of ammonium hydroxide or ammonia to dehydrate and distill said phenol under vacuum whereby substantially pure phenol is obtained in good yield and purity.

9. A process according to claim 8 in which the alkane hydrolysis controlling reagent is mineral spirits.

10. A process according to claim 8 in which the alkane hydrolysis controlling reagent is deodorized kerosene.

References Cited
UNITED STATES PATENTS

| | | | |
|---|---|---|---|
| 2,111,973 | 3/1938 | Kokatnur | 260—629 |
| 2,509,245 | 5/1950 | Nikowitz et al. | 260—623 |
| 2,803,670 | 8/1957 | Galat | 260—623 |

BERNARD HELFIN, Primary Examiner

W. B. LONE, Assistant Examiner